Inventors:
David J. BenDaniel,
James B. Comly,
by Richard R. Brainard
Their Attorney.

United States Patent Office 3,605,285
Patented Sept. 20, 1971

3,605,285
RANDOM ACCESS AUDIO-VISUAL EDUCATIONAL APPARATUS
David J. BenDaniel and James B. Comly, Schenectady, N.Y., assignors to General Electric Company
Filed May 26, 1969, Ser. No. 827,608
Int. Cl. G09b 5/04; G11b 17/00
U.S. Cl. 35—8A                                    9 Claims

ABSTRACT OF THE DISCLOSURE

A system for providing an audio explanation as a supplement for any desired information printed on a sheet of paper comprises an array of flexible contacts over which the sheet is positioned. By depressing the sheet at the location of the information for which additional explanation is desired, a phonograph pickup is moved into a predetermined one of a plurality of grooves recorded in the form of nested spirals on a phonograph disk in order to reproduce audibly the corresponding information recorded thereon.

INTRODUCTION

This invention relates to teaching systems, and more particularly to a system for providing random access to data in the form of recorded audio information in accordance with a sheet of printed material.

Various forms of apparatus have been employed in the past for the purpose of facilitating learning while relieving the classroom teacher for other duties. Included among these forms of apparatus are audio systems which provide, upon actuation by the student, one or more recorded audio messages pertaining to the lesson material. Audio tape recorders have been employed extensively for this purpose, since they permit storage of a relatively large amount of information without excessive size and cost requirements. By use of audio tape recorders, entire recorded lessons may be presented to the student, who may halt the tape and reverse its travel to listen again to any portion of the lesson which he failed to fully comprehend during the first time he heard it. Audio tape recorder apparatus requirements, to permit individual instruction with replay capability, comprise one tape and one tape playback unit per student.

Despite the advent of audio tape recorders, need has long existed for random access audio recordings, to supplement printed instruction material. It is a well-known fact that material to be learned can be assimilated at a much faster rate by reading printed material than by listening to a discussion of the material. Yet, a discussion of the material can go far toward explaining and supplementing the printed material, where a thorough understanding of the printed material is lacking. Ideally, therefore, a student should be permitted to study printed material, with access to further explanation of that material, where desired. The obvious way in which this might be accomplished would be to have the teacher present while the students are reading the material, so that the teacher can answer their questions as they arise during their reading. This approach, however, has two major drawbacks. First, as each question is asked, all the students in the class, with the exception of the questioner, are disturbed. This often results in diminished learning. Second, the teacher must be present during the entire study time, preventing him from performing other related classroom duties. Nevertheless, presence of the teacher in the classroom heretofore has been the only practical way in which this type of learning situation could be implemented. To record the teacher's responses on magnetic tape would be unsatisfactory, since access time on tape is quite lengthy. Moreover, the requirement of one tape recorder and one tape per student involves a substantially high apparatus cost on a per-student basis.

The present invention concerns random access apparatus which permits the student, at any time during his reading of printed material, to obtain, almost immediately, an audio discussion of any portion thereof which he fails to comprehend fully. The apparatus is designed so that several students can use the same audio recording apparatus and the same audio storage means at the same time, without interfering with each other's use of the equipment. Consequently, on a per student basis, apparatus cost is quite low.

To provide random access to audio information pertaining to his printed material, the student places a record, preferably a disk, related to his printed material on a phonograph turntable, and the turntable is maintained in continuous rotation. Information recorded on the disk is contained in a plurality of grooves recorded in the shape of nested spirals. Groove identification data are contained in an annular groove, close to the perimeter of the disk, intersecting each of the spirals at their outermost portions. A record of this type is described and claimed in D. J. BenDaniel et al. copending application Ser. No. 827,794, filed concurrently herewith and assigned to the instant assignee.

The phonograph has a pickup arm situated at each of a plurality of locations about the turntable. Each pickup arm is of the conventional type except that a small permanent magnet is mounted on each arm. In addition, a solenoid associated with each pickup arm, respectively, is situated about the turntable to influence the permanent magnet by either attracting or repelling the magnet, depending upon the polarity of DC current in the solenoid. Each pickup arm provides signals to a transducer, such as a set of earphones, used by an individual student who has control of the polarity of the magnetic field produced by the solenoid associated with his pickup arm. Phonograph apparatus of this type is also described and claimed in the aforementioned BenDaniel et al. application Ser. No. 827,794.

When the student places his sheet of printed material over an array of pushbuttons or other type of actuable contacts, he may then depress the sheet at any location of printed material that he fails to comprehend. The contacts beneath the sheet thus close a circuit which formulates selection data to select for playback a predetermined one of the nested spiral grooves. The stylus of the pickup arm connected to the student's earphones is dropped into the annular groove and, when groove identification data picked up from the annular groove matches the formulated selection data, which occurs when the disk is at a predetermined angular position with respect to the stylus, the solenoid produces a magnetic field tending to drive the pickup arm inwardly. Accordingly, since the record is continuously rotating, the stylus moves into the next spiral groove which it encounters, and the information recorded in that groove is played back to the student. Upon completion of playback, the pickup arm is attracted to the solenoid, which undergoes a reversal of its magnetic field after the stylus has moved into a spiral groove.

Accordingly, one object of the invention is to provide a system for correlating audio information to any desired portion of printed material.

Another object is to provide a system for permitting random access to data in the form of recorded audio information in accordance with a sheet of printed material.

Another object is to provide teaching apparatus which enables a student rapidly to obtain audio information regarding any portion of printed material being studied, by pressing a finger on the portion of printed material about which the information is desired.

Briefly, in accordance with a preferred embodiment of the invention, an audio-visual educational system comprises an array of finger-actuable flexible contacts adapted to receive a sheet of printed information thereon, and phonograph means including a pickup arm. The turntable of the phonograph means carries a record disk. Logic circuit means are provided to couple the array of finger-actuable flexible contacts to the phonograph means for actuating the stylus of the pickup arm to move in a predetermined groove of the disk.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF THE TYPICAL EMBODIMENTS

Figure 1:
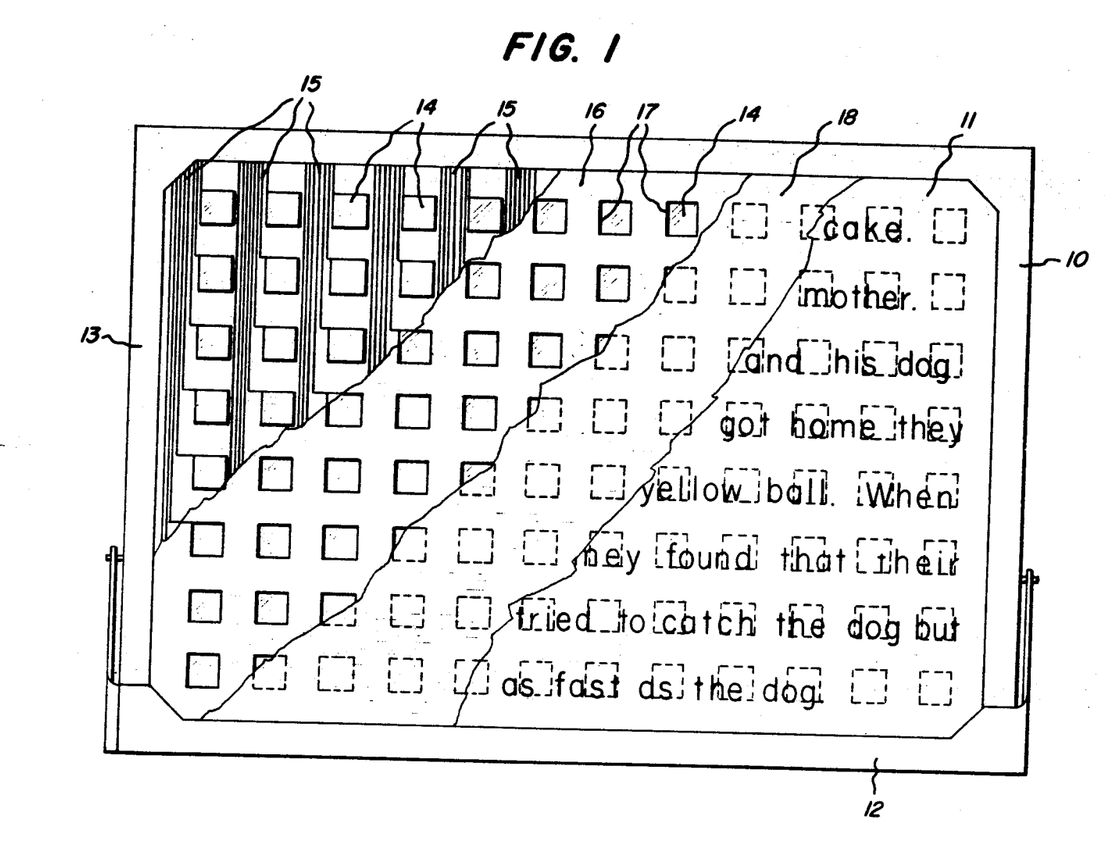
FIG. 1 is a partially cut away illustration of an array of finger-actuable contacts employed in the apparatus of the invention showing a sheet of printed material positioned atop the array.

FIG. 1 is a partially cutaway view of the finger-actuable or pushbutton contacts and the holder for printed material to be placed atop the array of finger actuable electrical contacts. Holder 10 comprises a guideframe into which a page 11 of printed material may be placed from above. In a typical holder for supporting a single sheet of printed material at a time, the holder may include a hinged portion 12 which may be raised or lowered to facilitate insertion of printed page 11 into holder 10.

At the bottom of holder 10 is situated a printed circuit insulated board 13 having an array of metallic conductors in the form of conductive islands 14 deposited thereon. Each of the printed circuit conductive islands 14 is connected respectively to a separate one of printed circuit leads 15. The printed circuit leads can also be on the other side of the circuit board allowing closer spacing of the islands. Leads 15 may be connected through a conventional printed circuit connector (not shown) to the electronic apparatus employed in the system of the invention.

A sheet of insulating material 16, such as Mylar, which is sold by E. I. du pont de Nemours and Company, Wilmington, Del., is situated atop printed circuit board 13. The sheet of Mylar is preferably in the order of 0.003 of an inch in thickness, and has openings 17 cut therein so as to be in registration with conductive islands 14.

A thin sheet 18 of conductive rubber, such as the type described in P. E. Wack et al., Electrical Conductivity of GR–S and Natural Rubber Stocks Loaded With Shawinigan and R–40 Blacks, 18 Journal of Applied Physics 456 (May 1947), is stretched over Mylar sheet 16 with sufficient tension to prevent it from sagging of its own weight through any of openings 17 to contact a conductive island 14. A single electrical contact (not shown) is made to rubber sheet 18.

The user of the apparatus inserts a printed page 11 atop rubber sheet 18, into holder 10, which rigidly locates the page with respect to conductive islands 14. Thus, when the user slightly depresses the printed page at any location atop an opening 17 in Mylar sheet 16, electrical contact is made to conductor 14 beneath opening 17, and an electrical voltage is thus applied to the conductor 14 in contact with rubber 18. The thickness of conductive rubber sheet 18 is thin enough (in the order of 12 mils) to readily yield to pressure of a finger upon page 11 over the appropriate opening 17 in Mylar sheet 16.

Instead of conductive rubber, the sheet 18 may be a laminate of fiberglass and copper such as a .003 inch fiberglass printed circuit board with .006 inch copper deposited on one side. In use, the board is depressed over one of the openings 17 and the copper coating moves into the selected opening 17 and into contact with the conductor 14 to complete a circuit corresponding to the selected information or word on the overlying page.

It should be noted that alternative forms of finger-actuated contacts may be employed in the apparatus of FIG. 1. For example, a grid of thermistors may be employed in order to sense finger temperatures. Ordinary pushbuttons may also be employed.

Figure 2:
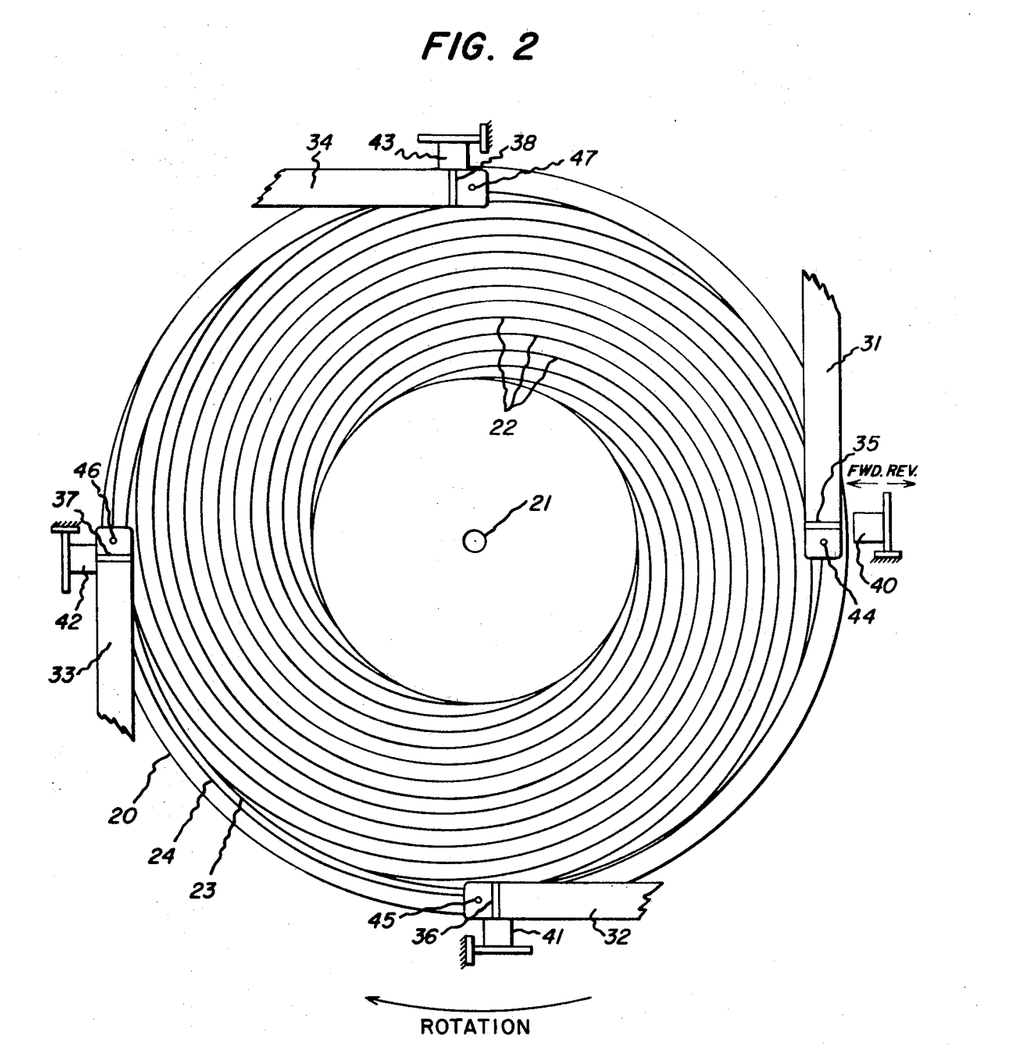
FIG. 2 is an illustration of a phonograph disk containing recorded audio information, and a plurality of pickup arms positioned to retrieve data therefrom.

FIG. 2 is an illustration of a phonograph disk 20, which provides storage of audio information for the system of the invention, and a plurality of phonograph pickup arms 31, 32, 33 and 34 situated at different locations around the disk. Disk 20 is mounted on a conventional turntable (not shown) and centered about a spindle 21 passed through a hole at the center of the disk. Information is recorded on disk 20 in the form of grooves 22 arranged in the shape of nested spirals. Although only 12 information grooves are shown on disk 20 for clarity of description, a 12 inch diameter disk will accommodate as many as 400 one-revolution spiral grooves. At a typical operating rate of 16⅔ revolutions per minute, a total of 24 minutes of information can be recorded on one side of a 12 inch disk. Of course, the groove lengths may be altered as desired, so that a 12 inch record may include, for example, 100 grooves in the form of nested spirals, each groove being 4 revolutions in length. Stereo recording may be used to double the information storage by one channel at a time with different messages on each channel.

Each of grooves 22 originates at an annular master groove 23 near the perimeter of the record. Typically, groove 23 is circumferential in configuration. If desired, a lead-in groove 24 containing no information may be recorded on the disk between the perimeter and annular groove 23. The purpose of lead-in groove 24 is to permit the stylus of the pickup arm to be lowered to the surface of the record outside the master groove 23 and thereby avoid undue wear on groove 23.

Each of pickup arms 31, 32, 33 and 34 is a conventional arm of the type employed in conventional phonographs, with the exception that a small permanent magnet 35, 36, 37 and 38 is mounted atop each arm, respectively. A DC operated solenoid 40, 41, 42 and 43, respectively, is mounted on the base of the phonograph (not shown) in a position to be adjacent to each of the respective pickup arms 31, 32, 33 and 34 when the respective pickup arm is in a rest or standby position. When in the standby position, the pickup arm is held by the solenoid and positioned so that its stylus is above the region of disk 20 between master groove 23 and the perimeter of the disk. When current flow in the solenoid, such as solenoid 40, is in one direction, pickup arm 31 is attracted to the solenoid due to the magnetic field of solenoid 40 acting in the reverse direction, as indicated by the arrow. On the other hand, when this current is reversed, the magnetic field produced by solenoid 40 also reverses and pickup arm 31 is pushed in a generally radial direction toward the center of the disk because of the mutual repulsion between the field of the solenoid and the field of permanent magnet 35. When solenoid 40 is deenergized, pickup arm 31 merely drops, lowering the stylus onto the portion of the disk beneath the stylus. The position of the stylus on the underside of each of pickup arms 31, 32, 33 and 34 is indicated by the region designated 44, 45, 46 and 47, respectively.

Certain features of controlling the radial position of a tone arm by a solenoid which may be energized in either of two directions to hold the tone arm or repel it radially inwardly in a predetermined position with respect to a record and turntable are described and claimed in BenDaniel et al. application Ser. No. 827,792, filed concurrently herewith and entitled "Audio Reproducing Apparatus and Random Access Playback System."

Information recorded in each of nested spiral-shaped grooves 22 comprises audio information intended to supplement the printed material on the page overlying the array of finger-actuated contacts, as illustrated in FIG. 1. This audio information may comprise whatever supplementary material the person writing the printed material desires to record. Each spiral-shaped groove is thus correlated with at least a single finger-actuated contact. In addition, where the printed material requiring explanation overlaps several contacts, each of those contacts is programmed to select the same spiral-shaped groove on disk 20.

In accordance with a feature of the present invention, the programming or accessing information is recorded in master groove 23 as part of the spiral groove identification information. In one embodiment, the spiral groove identification information is recorded in the form of audio tones representing binary numbers. Thus, one or more audio tones occurring simultaneously or in sequence provide information identifying the next spiral groove branching off from the master groove. By employing selection circuitry of the type illustrated in FIG. 3 and FIG. 3A or 3B, described infra, the permanent magnet on the pickup arm is repelled generally radially toward the center of the disk when the identification information for the spiral groove selected by the user has been encountered by the stylus in the master groove. The stylus thus enters the selected spiral groove.

In another embodiment, the spiral groove identification information may be recorded in the form of pulses which are counted as the phonograph disk is rotated. These pulses are counted by the apparatus illustrated in FIGS. 3 and 4, described infra. When the number corresponding to the spiral groove selected by the user has been reached, the pickup arm having its stylus traveling in the master groove is pushed inward by the mutual repulsion of the magnetic fields produced by the solenoid and the permanent magnet on the top of the pickup arm. The stylus thus enters the next spiral groove encountered, and the information recorded in the groove is played back to the user of the apparatus.

Upon completion of playback of a single sprial groove, the pickup arm is mechanically returned to its rest or standby position. Prior to this time, however, the magnetic field emanating from the solenoid has been reversed in polarity. The solenoid thus attracts the permanent magnet of the pickup arm and holds the arm in its standby or rest position until the next pushbutton contact has been closed by the user.

The system has capability of recording branching information. Thus, if desired, branching logic may also be recorded in the master groove of disk 20. Hence, if the same touch-sensitive contact has been closed twice in succession, indicating that the student did not fully understand the audio information presented after he depressed the contact the first time, the second depression of the pushbutton may establish logic to select another spiral groove wherein further and perhaps more simplified information is recorded. Depressing the same contact for a third time in succession may access yet another sprial groove to present still further information, or possibly new instructions, to the user.

Figure 2A:
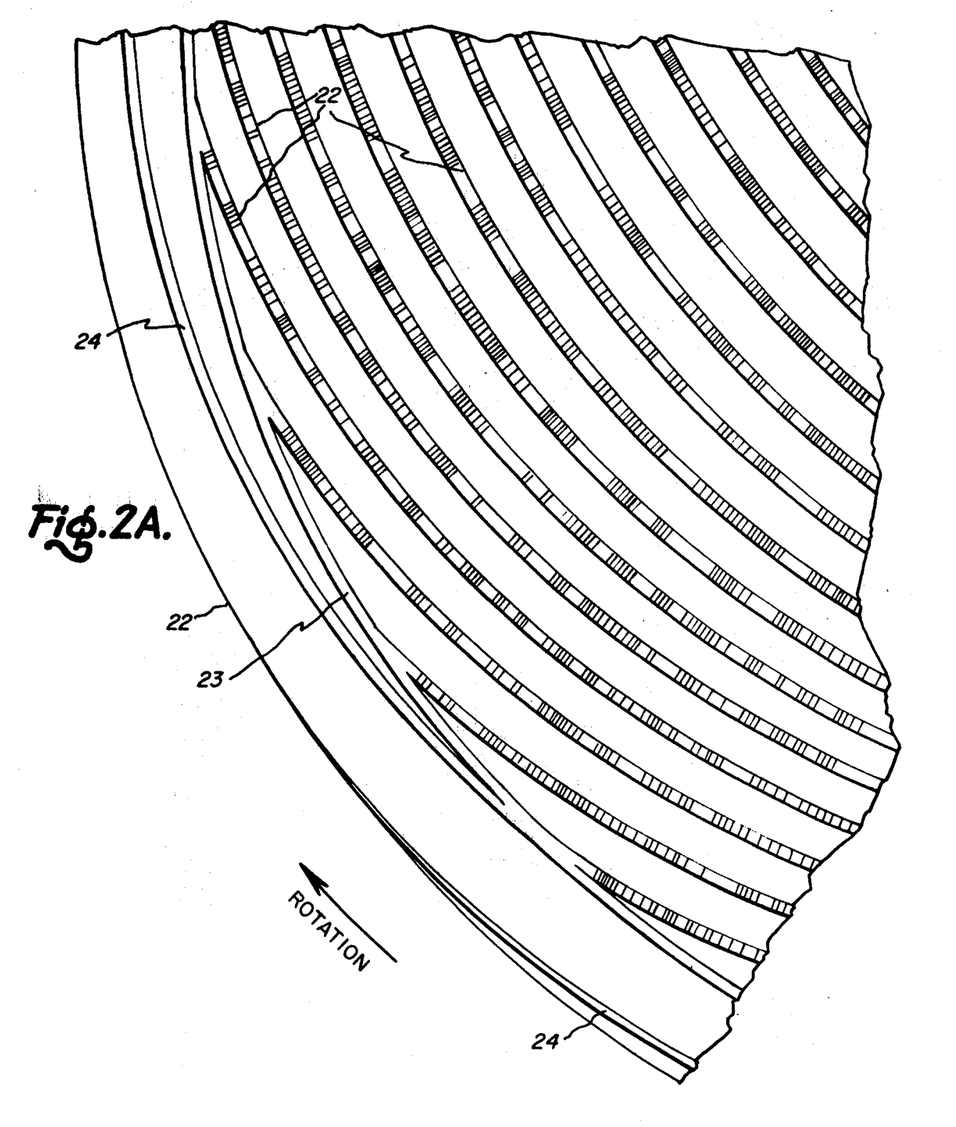
FIG. 2A is an enlarged illustration of a portion of the phonograph disk illustrated in FIG. 2.

FIG. 2A illustrates a greatly enlarged portion of disk 20, showing clearly how each of grooves 22 branches off from master groove 23. In addition, the position of lead-in groove 24 in relation to master groove 23 is also illustrated. Rotation of the disk in both FIGS. 2 and 2A is in the direction indicated by the arrow.

Figure 3:
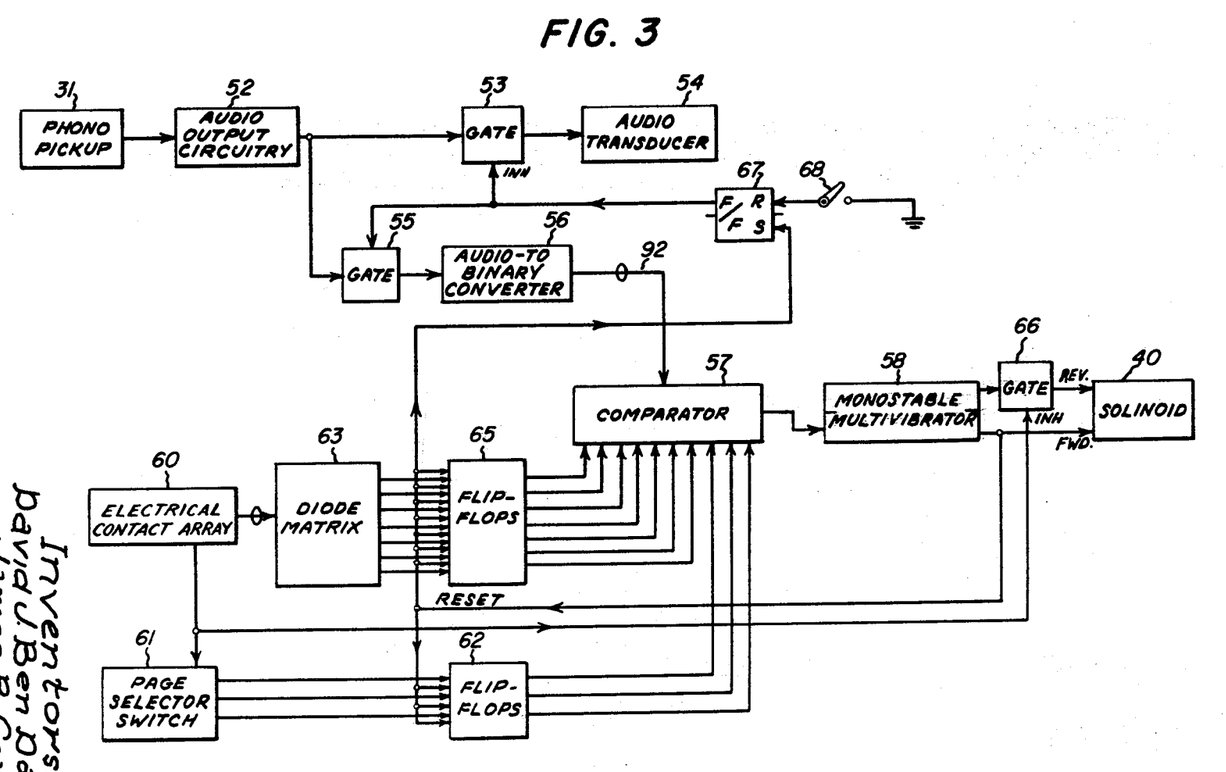
FIG. 3 is a block diagram of circuitry employed to actuate any one pickup arm on the phonograph of the invention.

FIG. 3 is a block diagram of electronic circuitry employed in one embodiment of the invention for a single student using pickup arm 31. It should be understood that a plurality of students may utilize the information recorded on a single disk by virtue of the plurality of pickup arms situated on the phonograph on which the disk is rotating, since operation of any pickup arm is independent of the operation of the other pickup arms. However, for simplicity, the electronic apparatus described is that which is utilized by but a single student. In addition, only monaural operation is described, although stereo recording may be employed to record information on each side of a single groove. Thus, in FIG. 3, the output of phono pickup 31 is coupled through audio output circuitry 52, which comprises conventional amplifier circuitry employed in the phonograph, to the input of an INHIBIT gate 53. The output of INHIBIT gate 53 is coupled to an audio transducer 54, preferably comprising a set of headphones. The output of audio output circuitry 52 is also coupled to the input of a gate 55 which is switched into its conductive condition at the same time gate 53 is switched into its blocked or nonconductive condition. Both gates 53 and 55 are actuated by the reset or R condition of a flip-flop circuit 67 which is reached upon closure of the phonograph reset switch 68. Reset switch 68 comprises the switch which is closed when the pickup arm reaches its centermost position on the disk in order to return the pickup arm to its starting or standby position.

Figure 3A:
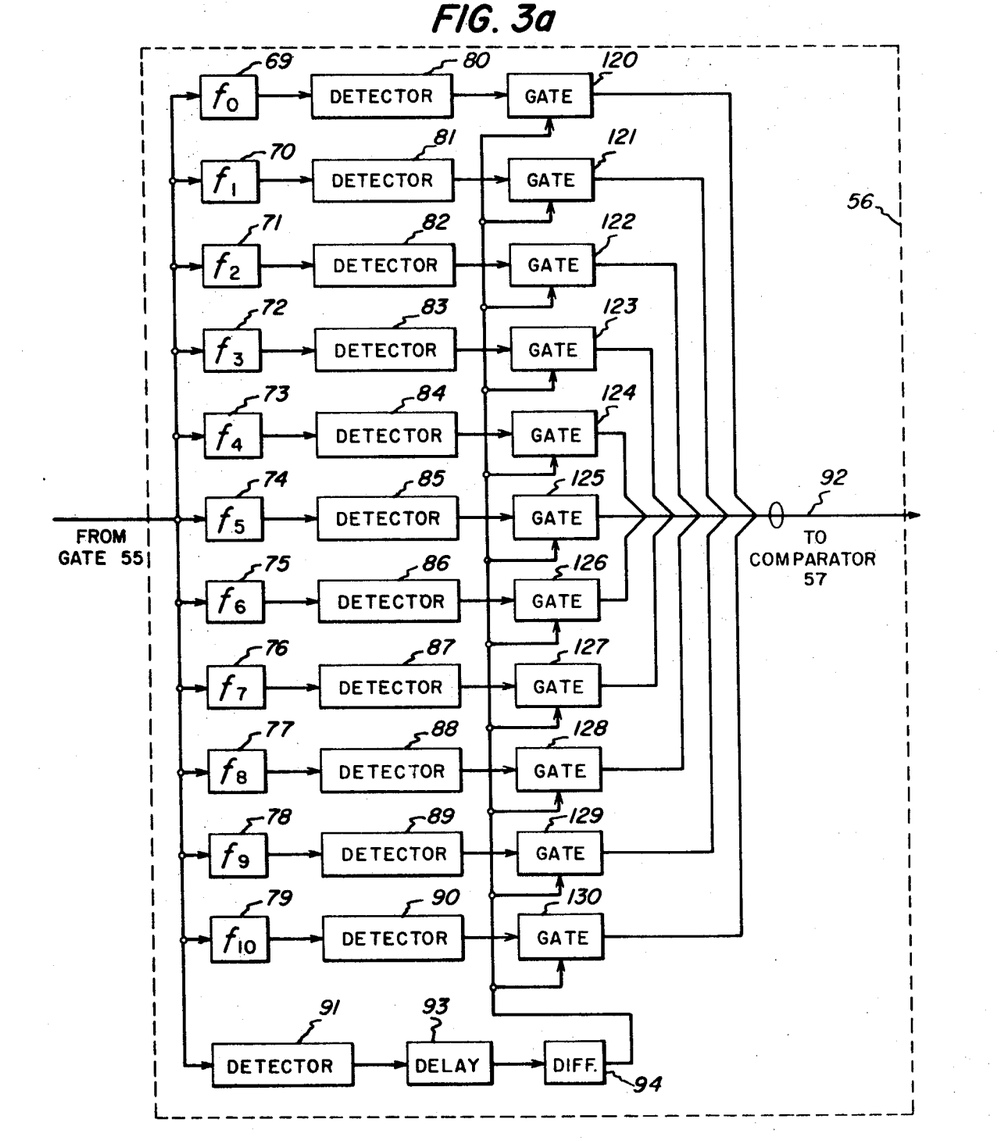
FIGS. 3A and 3B are block diagrams of circuitry which may be employed as the audio-to-binary converter of the apparatus shown in FIG. 3.
Figure 3B:
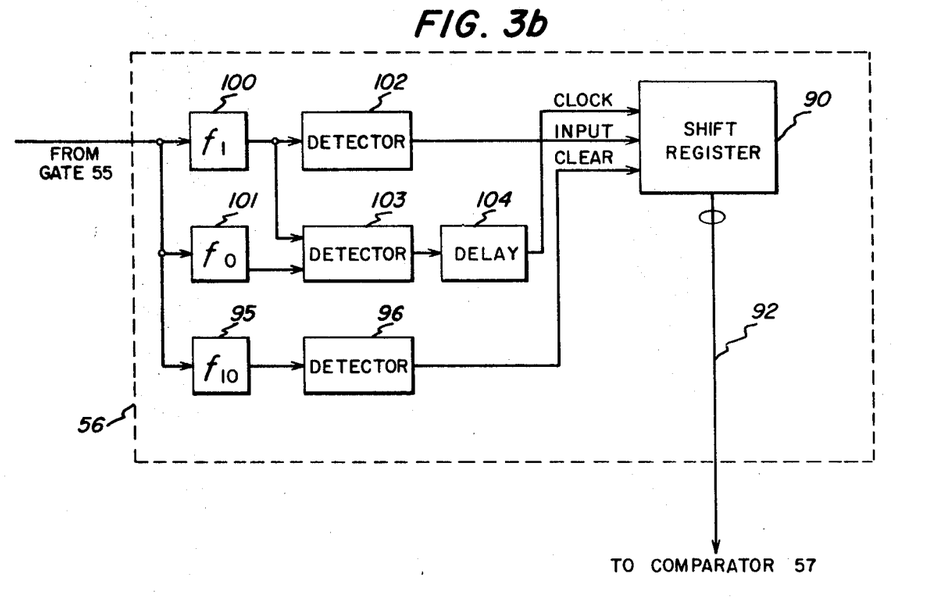

Output signals from gate 55 are coupled to an audio-to-binary converter 56. This converter changes audio tones into binary coded signals. Thus, if the spiral groove identification information recorded in the master groove of disk 20 is in the form of simultaneously occurring tones, each tone representing a separate binary number, audio-to-binary converter 56 totals the numbers represented by each of the simultaneously occurring tones into a single binary number. This operation is performed by conventional apparatus, one type of which is illustrated in FIG. 3A and described infra. In the alternative, if the spiral groove indentification information recorded in the master groove is in the form of sequentially occurring tones, wherein a tone of one frequency represents a binary ONE and a tone of another frequency represents a binary ZERO, then converter 56 may simply comprise a shift register receiving its input signals in serial fashion from gate 55 and furnishing an output signal to a comparator circuit 57 in parallel fashion. A circut of this type is illustrated in FIG. 3B and described infra.

Each student has a set of contacts 60 and a page selector switch 61 at his position. The page selector switch facilitates adding the total number of contacts, in whole number multiples corresponding to the number of the page positioned atop the array of contacts, to the number represented by the contact actuated by the student. This is accomplished by setting with switch 61, a plurality of flip-flops 62 to produce a desired number of signals corresponding to a binary representation of the page number whenever the selector switch is energized. This occurs whenever any one of contacts 60 is actuated.

Each of contacts 60 is connected to a conventional diode matrix 63 which sets a plurality of flip-flops 65 according to a binary representation of any contact which is depressed. Flip-flops 62 and 65 furnish a binary encoded signal, in parallel fashion, to comparator 57. In addition, an INHIBIT gate 66 coupling the stable output of a monostable or one-shot multivibrator 58 to solenoid 40 is switched into its blocked or nonconductive condition at the same time selector switch 61 is energized, which is whenever any one of contacts 60 is depressed. This interrupts the flow of DC current which had previously been maintaining a reverse-directed magnetic field emanating from solenoid 40. If desired, the outputs of each of flip-flops 62 and 65 may be conventionally strobed through a delay line (not shown) after a contact has been depressed, to allow transient voltages to settle down before the flip-flop output signals are applied to comparator 57.

Those circuits of the plurality of flip-flop circuits 62 and 65 receiving a binary ONE, for example, are set, and those circuits of the plurality of flip-flops receiving a binary ZERO are reset. In this fashion, the total binary number produced by contact 60 and switch 61 is stored in flip-flops 62 and 65 and applied to comparator 57. The binary number remains stored in flip-flops 62 and 65, even though the actuated contact has ben released, until the output signal from audio-to-binary converter 56 coincides with the output signal of flip-flops 62 and 65. At this juncture, monostable multivibrator 58 is switched into its unstable condition, actuating solenoid 40 with current flow in the reverse direction from that which had created the reverse-directed magnetic field, and simultaneouly resetting each of flip-flops 62 and 65.

In the circumstances wherein spiral groove identification information is recorded in the form of simultaneous audio tones of different frequencies, output signals in the form of binary information as furnished from audio-to-binary converter 56 to comparator circuit 57 through a cable 92. When coincidence is detected by comparator 57, monostable multivibrator 58 is driven into its unstable conditions causing a reversal of curent flow through solenoid 40; that is, a forward-directed magnetic field now emanates from the solenoid, deflecting permanent magnet 35, and hence pickup arm 31, in the forward direction. However, immediately after the signal from comparator 57 ceases, monostable multivibrator 58 restores itself to its normal condition. The signal from comparator 57 ceases immediately upon resetting of flip-flops 62 and 65 with the unstable output signal from multivibrator 58. Restoration of the multivibrator 58 to its normal condition, with no pushbutton depressed so that INHIBIT gate 66 is conductive, again causes a reversal of current flow in solenoid 40, and the magnetic field of the solenoid again tends to exert an attractive force on permanent magnet 35.

By coupling the output of monostable multivibrator 58, when in its normal condition, through INHIBIT gate 66 to solenoid 40, solenoid 40 maintains its reverse-directed field which holds the pickup arm tightly and, at the same time, keeps the pickup arm at a sufficient height above the phonograph disk to prevent the stylus from touching the disk. When gate 66 is inhibited by an output signal arising as a result of depressing any one of contacts 60, solenoid 40 de-energizes and releases the pickup arm. The pickup arm thus drops, allowing its stylus to contact the phonograph disk in the region between the master groove and the disk perimeter, and the lead-in groove then moves the stylus into the master groove.

During this period, flip-flop circuit 67 remains in its reset condition, maintaining gate 53 in its blocked or nonconductive condition and gate 55 in a conductive condition. This maintains audio transducer 54 muted and audio-to-binary converter 56 receptive to audio signals picked up from the master groove.

When monostable multivibrator 58 switches to its unstable condition as a result of comparator 57 having detected coincidence between the data recorded in the master groove of the phonograph disk and the data represented by the depressed one of contacts 60, flip-flops 62 and 65 are reset, flip-flop 67 is set, and audio-to-binary converter 56 ceases operation. This removes all data supplied to comparator 57. Monostable multivibrator 58 then switches back to its normal or stable condition. If at this time no contact is depressed, gate 66 is conductive and a reverse magnetic field is once again produced by solenoid 40. However, due to the separation between solenoid 40 and the pickup arm at this time, the reverse magnetic field of the solenoid is of insufficient strength to attract the pickup arm.

Because flip-flop circuit 67 is now in its set condition, designated S, gate 53 is rendered conductive and gate 55 is rendered nonconductive. The effect of flip-flop circuit 67 having switched to its set condition is thus to allow transducer 54 to reproduce audio information picked up by the stylus of the pickup arm and, at the same time, to prevent false actuation of converter 56 by the recorded audio information.

At the end of each information groove recorded on the disks, the reset switch 68 of the phonograph is closed. This switch, which actuates the phonograph pickup arm to return to its reset or standby position, is also coupled to the reset side of flip-flop circuit 67. The effect of the signal produced by reset switch 68 is thus to return flip-flop circuit 67 to its reset condition, thereby again inhibiting gate 53 and returning gate 55 to its conductive condition.

FIG. 3A is a schematic illustration of apparatus which may be employed in audio-to-binary converter 56 shown in FIG. 3. The apparatus comprises a plurality of different narrow band pass filter 69–79, with their band pass frequencies designated $f_0$–$f_{10}$, respectively. Each of filters 69–79 is coupled through an envelope detector 80–90, respectively, to the signal input of a gate 120–130, respectively, so that only a DC pulse can be applied to the signal inputs of the gates. The signals furnished to gates 120–130 are passed therethrough by a control signal occurring in response to any of the tone signals supplied to converter 56 from gate 55 of FIG. 3. The control signal is furnished from a differentiator circuit 94 in response to the output signal of a delay circuit 93 driven by an envelope detector 91. Envelope detector 91 is driven by the output signal of gate 55 of FIG. 3. By delaying the signal supplied to differentiator 94, sufficient time is allowed for transients at the outputs of detectors 80–90 to die out prior to furnishing the output signals of these detectors, in parallel, to comparator 57 through cable 92. False spiral groove identification data are thus avoided.

In operation, the concurrent audio tones which identify the spiral grooves are produced from phonograph pickup 31, shown in FIG. 3, whenever the stylus of the pickup rides in the master groove of the phonograph disk. Each tone represents a predetermined binary numeral. Thus, assuming up to ten different identification tones are employed, detection of one or more of these tones results in application of the binary number represented by these tones, after a delay due to delay circuit 93, through cable 92 to comparator 57 of FIG. 3. Application of this number to comparator 57 is only momentary, however, since it occurs only during the rise time of the output pulse produced by delay circuit 93 as determined by differentiator circuit 94. Similarly, the next-occurring tones representative of another spiral groove similarly produce a group of concurrent pulses which are applied to comparator 57, and so on. No intervening signals are required to clear the converter in preparation for its acceptance of the next group of concurrent audio tones.

FIG. 3B illustrates another form of audio-to-binary converter 56 which may be employed in the system of FIG. 3. However, this converter is employed where the spiral groove identification data recorded in the master groove of the phonograph disk are in sequentially occurring binary form, with the first-occurring digit identifying each spiral groove being a binary ONE so as to comprise an identification bit. For this circuit, a binary ONE filter 100 and a binary ZERO filter 101 are employed in order to detect the frequency designated $f_1$, indicative of ONE, and the frequency designated $f_0$, indicative of a ZERO. Filters 100 and 101 are narrow bandpass filters.

Filter 100 drives an envelope detector 102 and an envelope detector 103. Filter 101 drives envelope detector 103 only. Envelope detector 102 is connected to the input of a shift register 90, so as to provide an input pulse to the shift register whenever a binary ONE has been detected. Detector 103 is coupled to the clock input of shift register 90 through a delay circuit 104 which introduces a sufficient phase delay so that the output from detector 103 may advance the data stored in the individual stages of shift register 90 by a single stage, upon detection of either a binary ONE or binary ZERO signal. The output of shift register 90 is coupled, in parallel, to the input of comparator 57 through cable 92. Shift register 90 is cleared by a clear signal detected by a bandpass filter 95, designated $f_{10}$, which is coupled through an envelope detector 96 to the clear input of shift register 90. In this manner, binary information recorded on the master groove is stored in shift register 90 and supplied to comparator 57 each time an entire new digital word of binary information on the master groove of the phonograph disk has been sensed. By virtue of the aforementioned identification bit, output signals are withheld by shift register 90 until the identification bit arrives at the farthermost stage of shift register 90, thereby preventing application of false identification signals to comparator 57.

Figure 4:
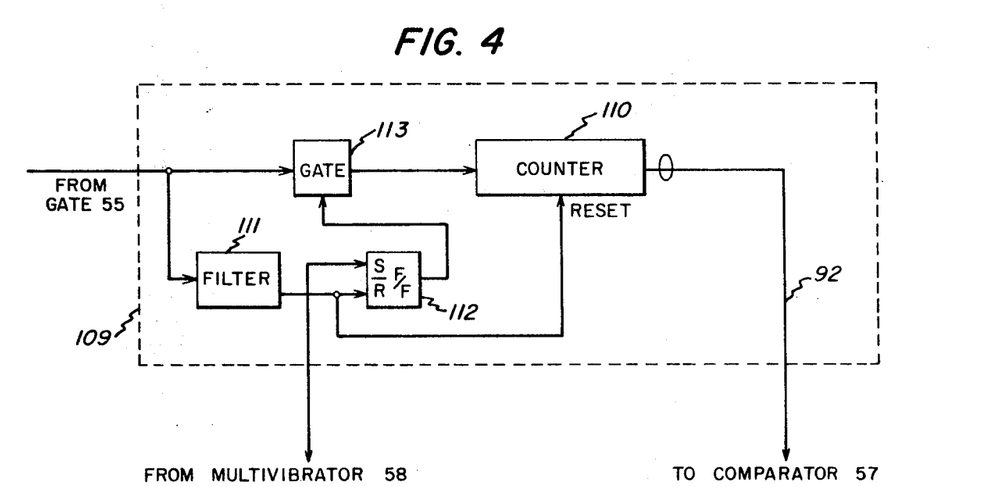
FIG. 4 is a block diagram of counter circuitry which may be utilized instead of the audio-to-binary converter of the apparatus shown in FIG. 3.

FIG. 4 illustrates counter circuitry 109 which may be substituted for audio-to-binary converter 56 of FIG. 3 whenever the spiral groove identification information recorded in the master groove of a phonograph disk is in the form of audio pulses to be counted. Thus, each of the audio pulses is furnished to the input of a pulse counter 110 which produces a binary output signal, in parallel fashion, over cable 92. The audio pulses furnished to the input of counter 110 are preferably of a single frequency. In addition, a reset signal of a different frequency is recorded in the master groove. This signal is detected by a narrow bandpass filter 111, the output of which resets counter 110 to zero. This reset pulse is recorded in but a single location in the entire master groove and serves as an indexing mark for counter 110 to begin counting. In addition, filter 111 resets a flip-flop circuit 112 which thereupon switches a gate 113 into its conductive condition. Gate 113 couples gate 55 of FIG. 3 to the input of counter 110, permitting the counter to begin its count from zero, since the counter is simultaneously reset to zero by the output signal from filter 111.

When counter 110 has counted to a number which coincides with the number furnished to the input of comparator circuit 57 from flip-flops 62 and 65, monostable multivibrator 58 switches into its unstable condition. The output of monostable multivibrator 58, when in its unstable condition, is furnished to the set input, designated S, of flip-flop circuit 112. This returns flip-flop circuit 112 to its set condition, rendering gate 113 nonconductive.

When flip-flop circuit 112 is next switched to the reset condition, gate 113 is again rendered conductive by the flip-flop circuit. At the same time, counter 110 is reset to zero by the output signal from filter 111 which resets the flip-flop circuit. The counter is then ready to begin counting the next time a contact is actuated.

To recapitulate operation of the system of the invention, a phonograph disk containing the audio information relating to a single book, group of pages, musical score, map, or list is placed on the turntable of the phonograph. Each user places the book on top of the touch-sensitive surface, turns to the page in which he is interested, which may either be the same page as that of the other students, or any other of the pages in the holder atop his array of finger-actuated contacts, and then sets his page selector switch 61 to correspond to the page situated atop his array of contacts. Several pages may be laid on top of each other since pressure can be sensed through more than one page. The turntable is started into continuous rotation. Each student then reads the page atop his array of contacts. Upon encountering an unfamiliar word or phrase about which he desires additional information, he presses his finger on the page at the location closest to the unfamiliar word or phrase.

The sequence of operations which next takes place can best be described with reference to both FIGS. 2 and 3, and operation of pickup arm 31 and solenoid 40 only, will be described. The depressed one of contacts 60 establishes a binary number at the output of flip-flops 65, while the depressed pushbutton also serves to energize page selector switch 61 and cause flip-flops 62 to establish a binary number at their outputs. The binary numbers thus established in flip-flops 62 and 65 are furnished to comparator 57. At the same time, depression of any of pushbuttons 60 inhibits gate 66, so that solenoid 40, which previously was in the reverse field generating condition, is de-energized. Pickup arm 31 then drops away from solenoid 40, permitting its stylus 44 to be guided by lead-in groove 24 to master groove 23 of disk 20. The pickup arm thereupon encounters recorded spiral information groove identification signals, and furnishes these signals through audio output circuitry 52 and gate 55, which is in the conductive condition, to audio-to-binary converter 56.

As the phonograph disk rotates, the output number supplied by converter 56 through cable 92 to comparator 57 continues to change. When comparator 57 detects coincidence, monostable multivibrator 58 is triggered into its unstable condition, causing solenoid 40 to produce a forward-directed magnetic field. This causes pickup arm 31 to be pushed essentially toward the center of disk 20, so that upon encountering the next-occurring information groove, the stylus enters the groove to enable reproduction of the audio information recorded thereon. At the same time, flip-flops 62 and 65 are reset and flip-flop circuit 67 is switched to its set condition. This causes comparator 57 to return to a no signal output condition, permitting monostable multivibrator 58 to return to its stable output condition. Because the depressed one of contacts 60 is by now released, gate 66 is no longer inhibited, and solenoid 40 is again returned to its reverse field generating condition. However, because the pickup arm 31 and its associated permanent magnet 35 have moved away from solenoid 40, the solenoid has no influence on the pickup arm at this time.

With flip-flop circuit 67 switched to its set condition, gate 53 is no longer inhibited, and gate 55 is switched to its nonconductive condition. Thus, audio-to-binary converter 56 can no longer receive signals from gate 55, and returns to a reset condition as a result of operation such as described in conjunction with FIGS. 3A and 3B, or FIG. 4. Audio transducer 54 thus reproduces the audio information recorded on the information groove 22 in which stylus 44 is travelling, permitting the user to listen to the audio information associated with the page overlying his array of sensors.

At the end of the information recorded on the selected one of information grooves 22, the phonograph mechanism returns pickup arm 31 to its standby or reset position, closing switch 68 so as to reset flip-flop circuit 67. This again inhibits gate 53, halting audio output signals from audio transducer 54. At the same time, gate 55 is again rendered conductive, permitting signals from audio output circuitry 52 to actuate audio-to-binary converter 56. Moreover, when the phonograph mechanism has returned pickup arm 31 to its reset or starting condition, permanent magnet 35 is attracted by the reverse field of solenoid 40, thus holding the pickup arm in the standby condition, ready for the next contact to be depressed.

In the event a unit of printed information on the page overlaps more than one contact, the system is programmed to reproduce the same information regardless of which one of the overlapped contacts is actuated. This is accomplished in a different way, depending upon whether the audio-to-binary converter 56 of FIG. 3 is that shown in FIG. 3A or 3B, or if it is replaced with counter circuitry 109 of FIG. 4. This, in turn, depends upon how the audio identification information recorded on master groove 23 just ahead of the intersection with the desired one of grooves 22 to be selected, and immediately following the preceding intersection of a groove 22 with master groove 23, is recorded. With the circuitry of FIG. 3A, this identification information involves the recording of a sequence of several simultaneous audio frequency tones, so that the tones represented by each of the contacts overlapped by printed information are recorded in this portion of groove 23 and regardless of which one of the contacts beneath the unit of printed information is depressed, the same one of grooves 22 is selected or accessed. With the circuitry of FIG. 3B, this identification information involves the recording of a sequence of several binary numbers in audio frequency form, so that, again, regardless of which one of the contacts overlapped by the unit of printed information is depressed, the same one of grooves 22 is accessed. With the circuitry of FIG. 4, this identification information involves recording of a sequence of several pulses in audio frequency form so that, as the stylus moves with respect to groove 23 in the region just ahead of the intersection with the desired one of grooves 22 to be selected, and immediately following the preceding intersection of a groove 22 with master groove 23, counter 110 counts through a range which includes each of the contacts overlapped by the unit of printed information. Again, therefore, regardless of which one of the contacts beneath the unit of printed information is depressed, the same one of grooves 22 is selected.

The foregoing describes a system for correlating audio information to any portion of printed material by permitting random access to data in the form of recorded audio information in accordance with a sheet of printed material. The system involves didactic apparatus which enables a student rapidly to obtain audio information regarding any portion of printed material being studied merely by pressing a finger on the portion of printed material about which the information is desired.

While only certain preferred features of the invention have been shown by way of illustration, many modifications and changes will occur to those skilled in the art. For example, information groove branching data may be recorded so that if the same contact is depressed consecutively more than once, a different information groove is accessed each time. It is, therefore, to be understood that the appended claims are intended to cover all such modifications and changes as fall within the true spirit of the invention.

What we claim as new and desire to secure by Letters Patent of the United States is:

1. In a machine for selectively reproducing any one of a plurality of recorded audio messages, the combination comprising:
   an array of finger-actuable electrical contacts adapted to receive a sheet of printed information-bearing material thereon;
   photograph means including a pickup arm having a stylus affixed thereto, said phonograph means carrying a record having a plurality of separate information-bearing grooves thereon; and
   logic circuit means coupled to said array of finger-actuable electrical contacts and to the electrical output of said phonograph means for effecting actuation of said pickup arm to move said stylus into a predetermined one of the grooves of said record in response to actuation of a corresponding one of said electrical contacts.

2. The machine of claim 1 wherein groove identifying data is recorded on said record in predetermined positional relation with respect to said separate information-bearing grooves and wherein said pickup arm produces an electrical output corresponding to said groove identifying data and actuation of said finger-actuable contacts formulates selection data and wherein said logic circuit means includes comparison means coupled jointly to the electrical output of said pickup arm and to said array of finger-actuable electrical contacts, said comparison means being responsive to the electrical output of said pickup arm when in coincidence with the formulated selection data produced by actuation of selected ones of said array of finger-actuable contacts to provide an output, and solenoid means responsive to the output of said comparison means for actuating said pickup arm to position said stylus in said predetermined groove in accordance with the contact in said array of finger-actuable contacts which has been actuated.

3. The machine of claim 2 wherein said solenoid means is normally energized to hold said pickup arm in standby condition and including control means coupling said comparison means to said solenoid means, said control means being responsive to actuation of any one of said array of finger-actuable contacts for immediately de-energizing said solenoid means to release said pickup arm from a standby condition.

4. The machine of claim 3 including switching means responsive to the position of said pickup arm and coupled to said solenoid means for energizing said solenoid means to return said pickup arm to a standby condition whenever the stylus of said pickup arm has completed its travel through the entire length of said predetermined one of said groove.

5. In a machine for selectively producing any one of a plurality of recorded audio messages, the combination comprising:
   an array of flexible electrical contacts adapted to receive a sheet of printed information-bearing material thereover;
   phonograph means including a pickup arm having electrically operated actuating means; said pickup arm producing an electrical output; and logic circuit means coupling said array of flexible electrical contacts to said electrically operated actuating means to effect actuation of said pickup arm in an inward direction on said phonograph means at a predetermined time in response to closing of any one of said flexible electrical contacts behind said sheet of material.

6. The machine of claim 5 wherein said logic circuit means includes encoding means responsive to the electrical output of said pickup arm, and gating means controllably coupling said encoding means to said pickup arm in response to the position of said pickup arm.

7. In a machine for selectively producing any one of a plurality of recorded audio messages in correlation with a predetermined portion of the information contained on a printed sheet, the combination comprising:
   an array of electrical contacts adapted to receive the printed sheet thereover, said contacts being actuable in response to pressure exerted thereon;
   phonograph means including a pickup arm having a stylus affixed thereto, said phonograph means carrying a record disk thereon; and
   logic circuit means coupling said array of electrical contacts to said phonograph means for urging said pickup arm to move in a generally radial direction toward the center of said disk when said disk reaches a predetermined angular position with respect to said stylus after any one of said contacts has been actuated.

8. The machine of claim 7 wherein said disk includes an annular groove containing angular position information regarding said disk, and said logic circut means includes comparator means, means coupled to said stylus for furnishing an output signal indication of said angular position to said comparator means whenever said stylus travels in said annular groove, means coupling said array of electrical contacts to said comparator means, and means responsive to said comparator means for actuating said pickup arm to move said stylus in a generally radial direction toward the center of said disk.

9. The machine of claim 8 including means responsive to said comparator means for muting audio output signals of said phonograph means whenever said stylus is out of contact with said disk and whenever said stylus travels in said annular groove.

References Cited

UNITED STATES PATENTS

| | | | |
|---|---|---|---|
| 3,276,144 | 10/1966 | Feldman | 35—5 |
| 3,371,933 | 3/1968 | Weitzner | 274—1 |
| 3,506,269 | 4/1970 | Hannah | 274—1 |

WILLIAM H. GRIEB, Primary Examiner

U.S. Cl. X.R.

274—1R